United States Patent [19]

Wohlstreicher

[11] Patent Number: 5,371,472

[45] Date of Patent: Dec. 6, 1994

[54] CHARGE AMPLIFIER FOR SENSORS OUTPUTTING ELECTRICAL CHARGE

[75] Inventor: Franz Wohlstreicher, Wegscheid, Germany

[73] Assignee: Siemes Aktiengesellschaft, Munich, Germany

[21] Appl. No.: 4,415

[22] Filed: Jan. 14, 1993

[30] Foreign Application Priority Data

Jan. 14, 1992 [EP] European Pat. Off. ........ 92100530.2

[51] Int. Cl.$^5$ .............................................. H03F 1/36
[52] U.S. Cl. ..................................... 330/107; 123/425; 330/294; 330/85; 330/108; 330/109
[58] Field of Search .................. 330/85, 294, 107, 109, 330/108, 105; 73/861.44, 861.43, 861.42, 861.55, 861.22, 862.628, 862.626, 517 R, 516 R; 307/520; 333/172; 123/425

[56] References Cited

U.S. PATENT DOCUMENTS

| | | | |
|---|---|---|---|
| 4,398,104 | 8/1983 | Podhrasky | 307/490 |
| 4,543,536 | 9/1985 | Pederson | 330/85 |
| 4,760,345 | 7/1988 | Büsser et al. | 330/9 |

FOREIGN PATENT DOCUMENTS

| | | |
|---|---|---|
| 0253016 | 1/1988 | European Pat. Off. . |
| 52-92460 | 3/1977 | Japan . |

OTHER PUBLICATIONS

Roger Melen, Tunable active filter maintains constant Q, Electronics Jul. 19, 1971 p. 72.
Electronics Today vol. 10 #11 Nov. 1981 titled "State Variable Filter".
Electronic Engineering, Oct. 1972 titled Low Power Triple Op Amp Siliconix L144.
IEE Proceedings Sections A a I, vol. 130(1983)Jun. No. 3, Part G, Old Woking, Surrey, Great-Britain, P. S. R. Diniz et al: "High-Performance Integrators and Applications in 2-Integrated Loop Biquads".

*Primary Examiner*—James B. Mullins
*Assistant Examiner*—James Dudek
*Attorney, Agent, or Firm*—Herbert L. Lerner; Laurence A. Greenberg

[57] ABSTRACT

A charge amplifier for sensors outputting electrical charge, particularly for piezoceramic pressure sensors, includes a voltage integrator having an output, an integration capacitor and a resistor connected parallel to the integration capacitor. A current-to-voltage converter is connected upstream of the voltage integrator and has an input. A negative feedback branch has a series circuit of a farther voltage integrator and a voltage-to-current converter. The negative feedback branch is connected between the output of the voltage integrator and the input of the current-to-voltage converter.

4 Claims, 1 Drawing Sheet

CHARGE AMPLIFIER FOR SENSORS OUTPUTTING ELECTRICAL CHARGE

The invention relates to a charge amplifier for sensors that output electrical charge, particularly for piezoceramic pressure sensors, having an integrator with an integration capacitor to which a resistor is connected in parallel.

Measuring the course of combustion chamber pressure in internal combustion engines affords the opportunity, among others, of cylinder-selective recognition of defective combustion processes, such as misfiring and engine knocking. Piezoceramic sensors which are used for such a purpose are mounted between the spark plug and the cylinder head, or in an indicator bore of the cylinder head that is directly exposed to the combustion chamber pressure. Such sensors emit a charge signal that is proportional to the course of the pressure in the cylinder.

The charge signal furnished by the sensor is amplified by a charge amplifier and converted into a voltage signal. In the ideal case, a charge amplifier is a current integrator.

Piezoceramic and other sensors that output an electrical charge have properties that impair the proportionality between the measurement variable (the combustion chamber pressure) and the sensor signal. The sensor-caused drift in the charge signal over the temperature, which results from a sudden engine load change, for instance, severely limits the useful signal range within the supply voltage range. Moreover, the current frequency response (spurious frequency response) of the charge amplifier leads to a high direct component in the output signal (hysteresis of the temperature-dictated signal drift).

In practice, known charge amplifiers (as shown in FIG. 1 which is discussed below) are driven by a resistor connected parallel to the integration capacitor. A resultant first-order high-pass filter in the charge frequency response prevents the charge amplifier from entering saturation in response to constantly integrated leakage currents within a short time.

The current frequency response (spurious frequency response) corresponds to a first-order low-pass filter, which does not damp temperature errors at all.

Moreover, in many cases, such known charge amplifiers tend to oscillate.

It is accordingly an object of the invention to provide a charge amplifier, which overcomes the hereinafore-mentioned disadvantages of the heretofore-known devices of this general type, in which both the temperature drift and the hysteresis are substantially less and which does not tend to oscillate.

With the foregoing and other objects in view there is provided, in accordance with the invention, a charge amplifier for sensors outputting electrical charge, particularly for piezoceramic pressure sensors, comprising a voltage integrator having an output, an integration capacitor and a resistor connected parallel to the integration capacitor; a current-to-voltage converter being connected upstream of the voltage integrator and having an input; and a negative feedback branch including a series circuit of a further voltage integrator and a voltage-to-current converter, the negative feedback branch being connected between the output of the voltage integrator and the input of the current-to-voltage converter.

In accordance with another feature of the invention, the resultant circuit structure (as shown in FIG. 2 which is discussed below) is split into a stable current-to-voltage converter, that is advantageously constructed as a current amplifier, and a voltage integrator in which the resistor, that is connected to an output voltage divider and connected parallel to the integration capacitor, can have a relatively low resistance, which is uniformly demanded (integration capability, leakage currents) for use in motor vehicles.

More particularly, in accordance with a further feature of the invention, there is provided a voltage divider being connected between the output of the voltage integrator and reference potential of a voltage supply, the voltage divider having a tap, the voltage integrator having an input, and the resistor connected parallel to the integration capacitor being connected between the tap of the voltage divider and the input of the voltage integrator.

Moreover, the circuit affords major advantages in signal processing. The integrator in the negative feedback branch leads to a charge frequency response that acts as a second-order high-pass filter. Temperature gradient errors of the sensors are suppressed twice as well as in the known charge amplifier, as are other temperature-caused effects. The drift in the output voltage upon a load change is then only half as pronounced.

The current frequency response exhibits bandpass behavior, so that errors in hysteresis are suppressed completely. As a result, the sensor no longer exhibits practically any apparent hysteresis effect in the output signal drifting when a load change occurs.

Moreover, in this circuit, it is possible to use substantially smaller capacitors for both integrators. Low capacitances make lesser demands of the output stage of the charge amplifier, because the amplifier need not furnish a high charge current. Low-capacitance ceramic capacitors with very low tolerances (1%) are available, which means that the charge amplifier is usable at the higher temperatures arising in motor vehicles, unlike foil capacitors, which are available only with substantially larger tolerances for use in higher temperature ranges. Yet low tolerances are important, since the capacitance directly determines the magnitude of the output voltage.

The necessity for high capacitances in conventional charge amplifiers accordingly makes them virtually impossible to use in motor vehicles at high temperatures.

In accordance with an added feature of the invention, the voltage-to-current converter is a resistor.

In accordance with a concomitant feature of the invention, the voltage-to-current converter is a controlled current source.

Other features which are considered as characteristic for the invention are set forth in the appended claims.

Although the invention is illustrated and described herein as embodied in a charge amplifier, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
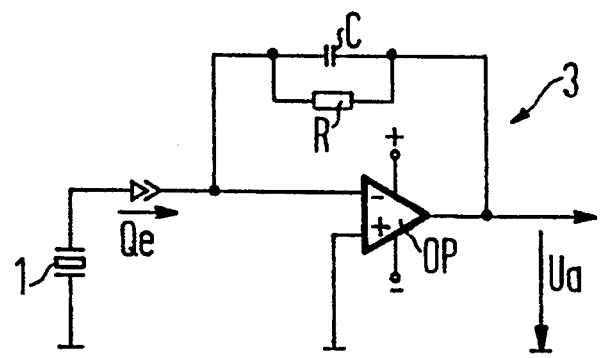
FIG. 1 is a schematic circuit diagram of a known charge amplifier.

Referring now to the figures of the drawing in detail and first, particularly, to FIG. 1 thereof, there is seen a circuit of a known, discrete-type charge amplifier, including an operational amplifier OP that is wired as an integrator 3, having an integration capacitor C which has a resistor R connected parallel to it and performs the function of a current integrator with charge amplification. Its advantages and disadvantages have already been discussed above. The charge amplifier of FIG. 1 converts a charge signal Qe, obtained from a piezoceramic sensor 1, into an output signal Ua that is as proportional as possible.

Figure 2:
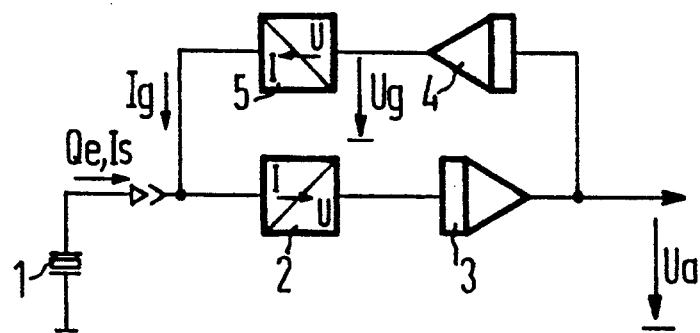
FIG. 2 is a basic circuit diagram of a circuit configuration of a charge amplifier according to the invention.

FIG. 2 shows a basic circuit diagram of a charge amplifier according to the invention. This circuit diagram illustrates individual functions and is therefore advantageous, because exemplary embodiments in different techniques, such as an integrated version, in which the embodiment of the various function blocks may differ considerably from the exemplary embodiment, made by a discrete technique shown in FIG. 3.

An output signal of the piezoceramic sensor 1, that is the charge Qe or a sensor current Is, is converted in a current-to-voltage converter 2 into a voltage signal, which is converted in a following voltage integrator 3 into the output signal Ua. This output signal Ua is negatively fed back from the output of the voltage integrator 3 to the input of the current-to-voltage converter, through an integrator 4 and a voltage-to-current converter 5. The mode of operation and advantages of this basic circuit have likewise already been explained in detail above.

Figure 3:
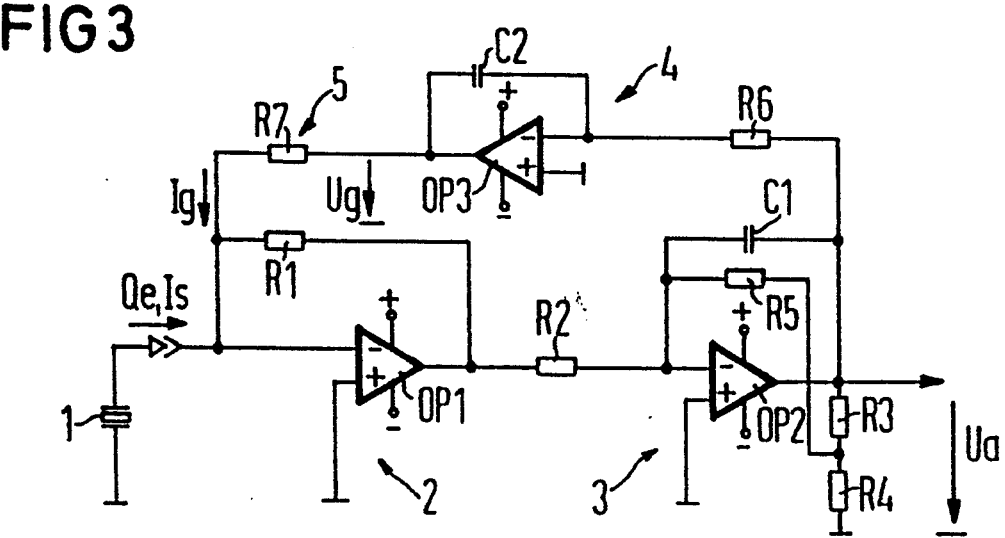
FIG. 3 is a basic circuit diagram of an exemplary embodiment of a charge amplifier according to the invention.

Finally, FIG. 3 shows an exemplary embodiment of a charge amplifier according to the invention, which corresponds to the basic circuit diagram of FIG. 2 but is of a discrete type, which is constructed with operational amplifiers.

In this embodiment, the current-to-voltage converter 2 is constructed as a current amplifier, which includes an operational amplifier OP1 wired with a resistor R1, that converts the input signal Qe or Is of the piezoceramic sensor 1 into a voltage signal. This signal is integrated to make the output signal Ua through the use of the following voltage integrator 3, which includes an operational amplifier OP2 wired with an input resistor R2 and a negatively fed back integration capacitor C1 with a resistor R5 that is connected in parallel with the integration capacitor C1 through a tap of an output voltage divider R3, R4. This output signal Ua is then further processed in a non-illustrated manner, for instance to produce pressure and/or knocking signals.

In the negative feedback branch, the output signal Ua is integrated to make a voltage signal Ug, through a further voltage integrator 4 which includes an operational amplifier OP3 that is wired with an input resistor R6 and an integration capacitor C2, in this case without any parallel resistor. Through the use of a voltage-to-current converter 5 formed by a resistor R7, this voltage signal Ug is then converted into a current signal Ig that is superimposed on the output signal Is of the sensor 1.

Advantageously, the voltage-to-current converter 5 (which is equivalent to the resistor R7) of FIGS. 2 or 3 may be constructed as a controlled bipolar current source between the supply terminals and the input of the current-to-voltage converter 2. This source is controlled by the output signal Ug of the negative feedback integrator 4.

This is especially advantageous if the circuit is to be an integrated circuit, since the entire circuit except for the two capacitors C1 and C2 is integratable. In that case, the negative feedback integrator 4, including the resistor R6, which like the resistor R7 is of relatively high impedance when made in discrete form, can be constructed with current source circuits, so that these two resistors need not be made in high-impedance integrated form.

I claim:

1. A charge amplifier for sensors outputting electrical charge, comprising:
   a voltage integrator having an output, an integration capacitor and a resistor connected parallel to said integration capacitor;
   a current-to-voltage converter being connected upstream of said voltage integrator and having an input; and
   a negative feedback branch including a series circuit of a further voltage integrator and a voltage-to-current converter, said negative feedback branch being connected between the output of said voltage integrator and the input of said current-to-voltage converter.

2. The charge amplifier according to claim 1, wherein said current-to-voltage converter is connected as a current amplifier.

3. The charge amplifier according to claim 1, including a voltage divider being connected between the output of said voltage integrator and reference potential of a voltage supply, said voltage divider having a tap, said voltage integrator having an input, and said resistor connected parallel to said integration capacitor being connected between said tap of said voltage divider and the input of said voltage integrator.

4. The charge amplifier according to claim 1, wherein said voltage-to-current converter is a resistor.

* * * * *